F. H. VAN HOUTEN.
DOUGH DIVIDING MACHINE.
APPLICATION FILED FEB. 1, 1916.

1,283,987.

Patented Nov. 5, 1918.
2 SHEETS—SHEET 1.

Inventor
Frank H. Van Houten

F. H. VAN HOUTEN.
DOUGH DIVIDING MACHINE.
APPLICATION FILED FEB. 1, 1916.
1,283,987.
Patented Nov. 5, 1918.
2 SHEETS—SHEET 2.
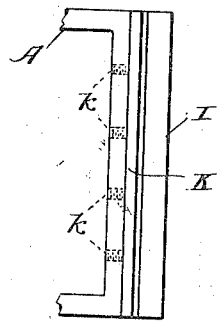
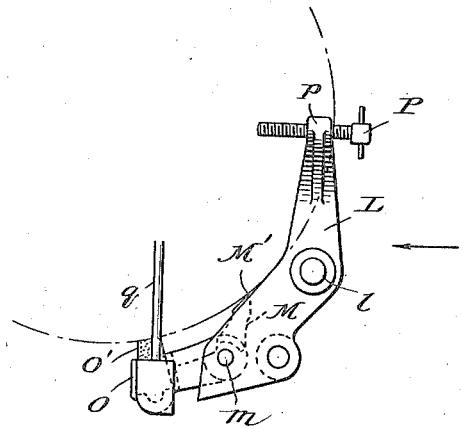
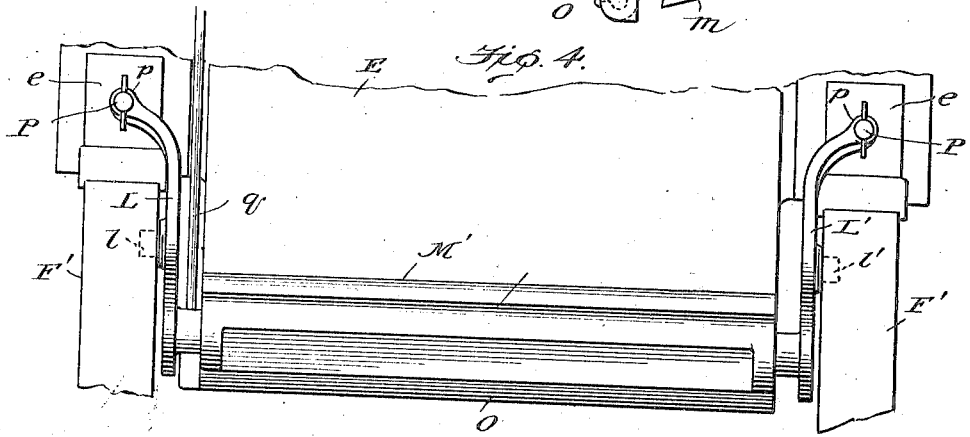
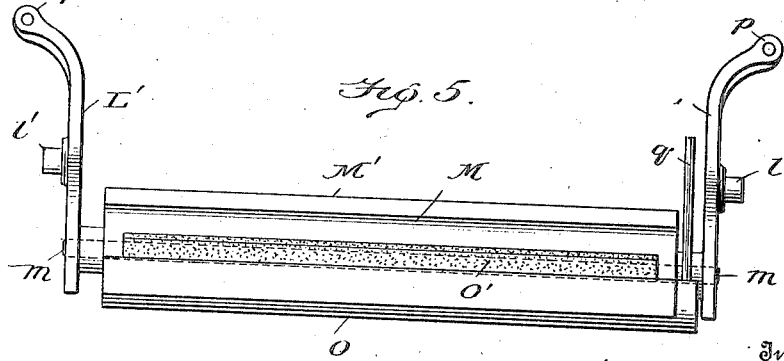
Inventor
Frank H. Van Houten
By Church & Church
his Attorneys
Witness
Edward A. White
Thomas Durant

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

DOUGH-DIVIDING MACHINE.

1,283,987.  Specification of Letters Patent.  Patented Nov. 5, 1918.

Application filed February 1, 1916.  Serial No. 75,535.

*To all whom it may concern:*

Be it known that I, FRANK H. VAN HOUTEN, a citizen of the United States, residing at Beacon, in the county of Dutchess and State of New York, have invented certain new and useful Improvements in Dough-Dividing Machines; and I do hereby declare the following to be a full, clear, and exact description of the same, reference being had to the accompanying drawings, forming part of this specification.

This invention relates to dough dividing machines of that type wherein the dough is fed from a compression chamber into measuring pockets in a movable head or cylinder, each of said pockets having within it a plunger which is retracted for the admission of a new charge of dough and advanced to discharge the dough from the pocket when the head has moved to bring the pockets out of registry with the compression chamber.

Machines of this type have embodied a number of different mechanical arrangement of parts and for the purpose of illustrating the present invention, I have adopted a machine of the general type shown in my prior Patent No. 1,158,339. In dough dividing machines of this type it quite frequently happens that a film or layer of dough clings to the surface of the measuring cylinder after the pockets have left the compression chamber and also the dough is apt to cling to the surface of the cylinder during the discharge of the dough when the plungers are advanced. It is most desirable that the surface of the cylinder be kept free of dough at all times, in order that the cylinder and other parts may work smoothly and also to maintain clean conditions in the machine.

The object of the present improvement is to provide a very simple and efficient arrangement which will keep the surface of the cylinder free from dough at all times and also apply a lubricant to the surface of the cylinder after the discharge of the dough from the pockets and during return of the pockets to filling position. Although the invention, for convenience, is shown as applied to dough dividing machines of the type disclosed in my prior Patent No. 1,158,339, it will be understood that the invention is not to be limited to this specific application but may be embodied in other types of dough machinery as well.

The invention consists in the construction, arrangement and combination of parts hereinafter set forth, and the novel features of the invention will be particularly pointed out and specified in the claims at the end of the specification.

In the drawings:

Fig. 2 is a bottom plan view of a portion of the dough hopper, illustrating in detail the improved gib which forms one of the members keeping the surface of the cylinder free from dough.

Fig. 3 is a detail side elevation of the improved combined oiler and scraper.

Fig. 4 is an end view of the same looking in the direction of the arrow.

Fig. 5 is an end view looking in the opposite direction from that of Fig. 4.

Like characters of reference in the several figures indicate the same parts.

Figure 1:
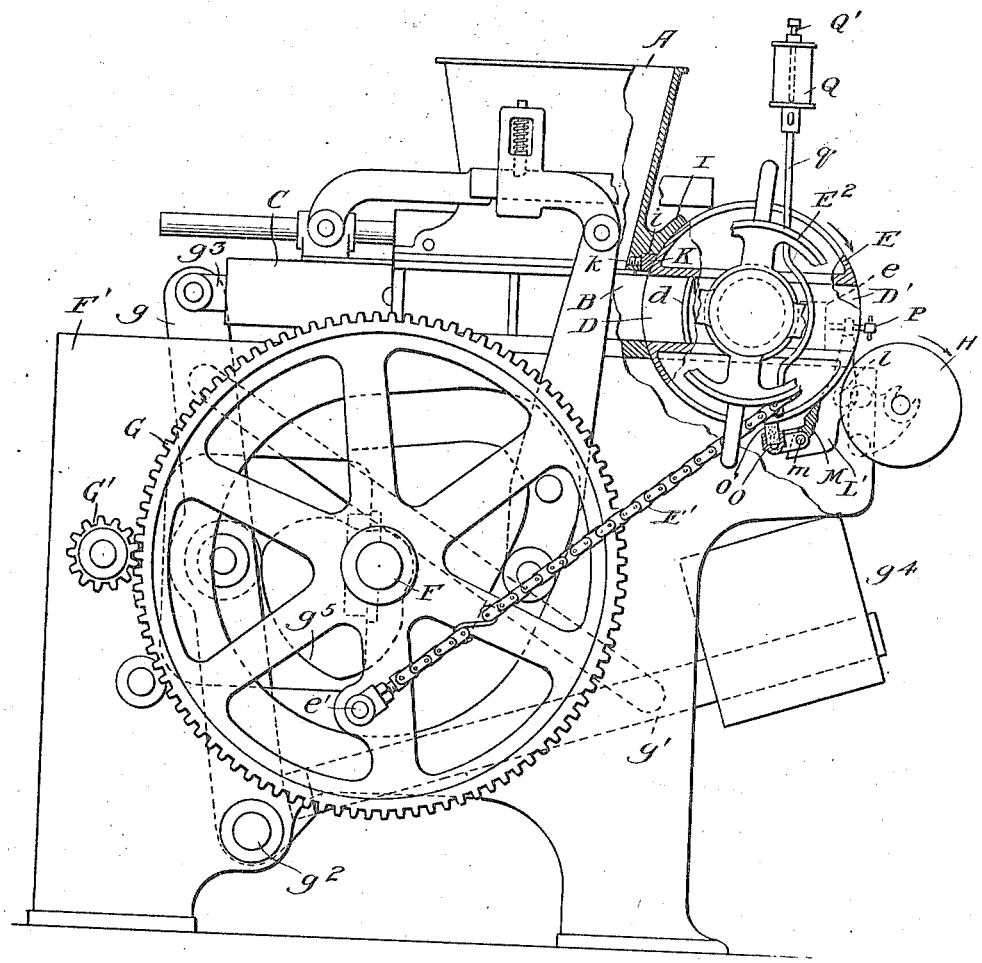
Figure 1 is a side elevation partly in section of a dough dividing machine embodying the present improvements.

The machine adopted for illustrating the present invention embodies in its construction a hopper A into which the dough to be divided is deposited, and the discharge end of said hopper leads into a compression chamber B. Working within the compression chamber is a reciprocatory plunger or head C adapted to advance the dough into the measuring cylinder D and to force the same into the pockets in said cylinder at a substantially predetermined pressure. The operating mechanism for the plunger is in its general characteristics similar to that disclosed in my prior Patent No. 1,158,339, and may be briefly described as follows:

A cam shaft F is journaled in the frame F' of the machine and receives rotary motion through the medium of a large gear wheel G meshing at one end with a pinion G' which forms part of a train of drive gearing deriving power from any suitable source, not shown. A weighted bell crank lever formed by the arms $g$, $g'$, is mounted on a transverse shaft $g^2$, the arm $g$ being pivotally connected by a link connection $g^3$ with the rear end of the plunger C, while an adjustable weight $g^4$ is mounted on the arm $g'$. The weight $g^4$ serves as the means for advancing the plunger and dough and for forcing the dough into the measuring pockets, while a cam $g^5$ on the shaft F serves as the means for retracting the plunger and elevating the weight $g^4$. The measuring cylinder or drum E having the chambers or pockets therein for the reception of the dough, is journaled in bearings $e$ in the main frame and at one end is provided with means whereby it is given an intermittent rotary movement, in the present instance each movement corresponding to substantially one-half of a revolution. The mechanism for rotating the cylinder is similar to that now in use and, briefly, it embodies a chain or flexible connection E' connected at one end with a crank pin $e'$ eccentrically mounted on the gear wheel G and at the opposite end with a drum or pulley $E^2$ journaled on the end of the cylinder E and adapted to connect therewith through a pawl and ratchet connection, not herein illustrated. It will be understood that one-half a revolution of the cylinder E through the medium of the above described connections will operate to bring one series of measuring pockets D into registry with the discharge end of the compression chamber B and simultaneously to carry another series of measuring pockets D' out of registry with the compression chamber. Within the pockets are plungers $d$, which are retracted when the pockets are in filling position, the pockets D being shown in filling position in Fig. 1 of the drawing. The said plungers are advanced as the pockets are carried away from filling position during one-half a revolution of the cylinder E, in the direction of the arrow, and the advance movement of the plungers will operate, as will be understood, to discharge the dough from the pockets on to a take-off roller H.

The present invention is particularly concerned with the provision of a novel arrangement for keeping the surface of the measuring cylinder E at all times free from dough, this being a most desirable condition not only for the sake of cleanliness but also to permit ease in operation of the machine.
As shown in Fig. 1 of the drawings the front wall I above the compression chamber B is curved to correspond with the curved cylindrical face or surface of the cylinder E and said cylinder E is positioned to fit quite closely to the front wall I. At the forward edge of the wall just above the compression chamber B is formed a recess $i$ substantially coextensive with the operative face of the cylinder E. Positioned in said recess $i$ and adapted to contact with the surface of the cylinder E is a gib also substantially co-extensive with the length of the cylinder. The gib K is illustrated in detail in Fig. 2 of the drawings and is secured to the wall I by means of adjustment screws $k$ fitted in suitable sockets connecting the inner wall of the recess $i$ with the interior of the hopper A. These screws provide a means for adjusting the position of the scraping edge of the gib K relatively to the surface of the cylinder E. It will be noted that the gib engages that portion of the surface of the cylinder E following the pockets which have just been filled by the advancing movement of the plunger and thus any particles of dough remaining in the compression chamber which would otherwise be carried around by the surface of the cylinder E are scraped off by the gib.

At the discharge end of the machine is mounted a pair of spaced bracket arms L, L'. These bracket arms are respectively journaled on the pivots $l$, $l'$ in the frame F' and support between them at their lower ends the combined oiler and scraper. The combined oiler and scraper consists of a relatively long bar M pivotally mounted by means of the shaft $m$ between said bracket arms L, L' and having at its end facing the discharge end of the machine a scraping edge M' which is held in contact with the surface of the cylinder E by the bracket arms. The other end of the bar M is formed with a trough O running substantially the entire length of the bar and fitted with a strip of suitable absorbent material, such as a wick, O' brushing against the surface of the cylinder E. Each bracket arm is provided at its upper end with a bearing $p$ receiving an adjusting screw P, the inner ends of which are adapted to engage a fixed portion of the frame, such as the parts $e$. By rotating the handles of the adjusting screws of the two bracket arms the position of the bar M may be adjusted relatively to the surface of the cylinder E. A supply of lubricant is supplied to the trough below by means of an oil tube $q$ suitably supported in the frame F' and having at its upper end an oil cup Q, of any well known type. The oil feed may be regulated by means of a needle valve Q'.

It will be noted that after the dough is discharged on to the take-off roller H the surface of the cylinder E is rotated into contact with the scraping edge M' of the bar M and hence any particles of dough are scraped off the surface of the cylinder. The rotating surface is next brought into contact with the wick O' which swabs a thin film of oil or other suitable lubricant over the face of the cylinder. In the present arrangement the two scrapers, namely, the gib K and the bar M are positioned at the points where there is the greatest liability of dough being deposited on the face or surface of the cylinder, this being just after the filling of the pockets and just after the discharge of the dough from the pockets. As a result the surface of the cylinder is kept clean of dough, thereby insuring practically sanitary conditions in the machine and free running of the mechanism at all times.

What is claimed is:—

1. A combined oiler and scraper for dough measuring cylinders and the like, embodying a support, a member pivoted to said support having a scraping edge at one end and a trough at the other end, said trough and scraping edge both substantially coextensive with the length of the measuring cylinder, a strip of absorbent material in said trough adapted to brush against the surface of the cylinder, and a tube for supplying a lubricant to said trough.

2. The combination with the support and a measuring cylinder, of spaced bracket arms pivotally mounted on said support, a member pivoted between said bracket arms having a scraping edge at one end and a trough at the other end, a strip of absorbent material in said trough, the trough and scraping edge being positioned by the arms to contact respectively with the surface of the measuring cylinder, and means for supplying a lubricant to said trough.

3. The combination with the support and a measuring cylinder, of spaced bracket arms pivotally mounted on said support, a member pivoted between the lower ends of said bracket arms having a scraping edge at one end and a trough at the other end, a strip of absorbent material in said trough, the trough and scraping edge being positioned by the arms to contact respectively with the surface of the measuring cylinder, means for supplying a lubricant to said trough, stops mounted in the upper ends of the bracket arms adapted to engage a fixed portion of the support and thereby determine the position of the pivoted member relatively to the measuring cylinder, and means for adjusting said stops.

4. The combination with the support and a measuring cylinder, of longitudinally spaced bracket arms on said support, a longitudinally extending member pivotally mounted in said bracket arms having a scraping edge at one end and a trough at the other end, said trough extending approximately the entire length of said member, a strip of absorbent material in said trough, means for simultaneously adjusting the scraper and trough relatively to the surface of the measuring cylinder, and means for supplying a lubricant to said trough.

5. The combination with the support and a measuring cylinder, of spaced bracket arms pivotally mounted in said support, a combined oiler and scraper formed from a single member pivotally mounted in said bracket arms, and means for positioning said member with respect to the surface of the cylinder whereby the oiling and scraping faces thereof may be simultaneously adjusted relatively to the cylinder surface.

FRANK H. VAN HOUTEN.

Copies of this patent may be obtained for five cents each, by addressing the "Commissioner of Patents, Washington, D. C."